March 7, 1950 L. B. WARD 2,499,938
FLAME CUTTER
Filed April 22, 1947 2 Sheets-Sheet 2
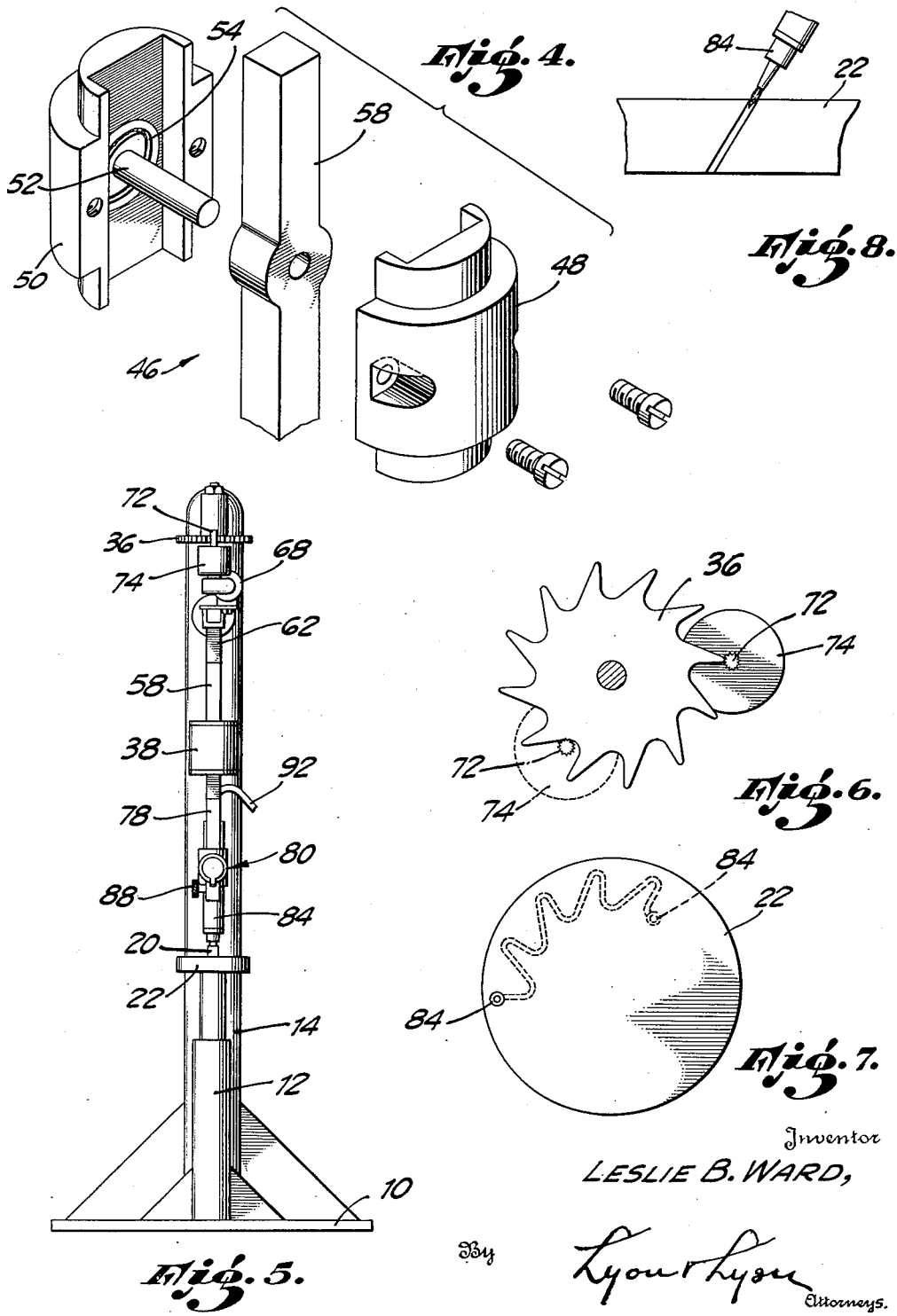

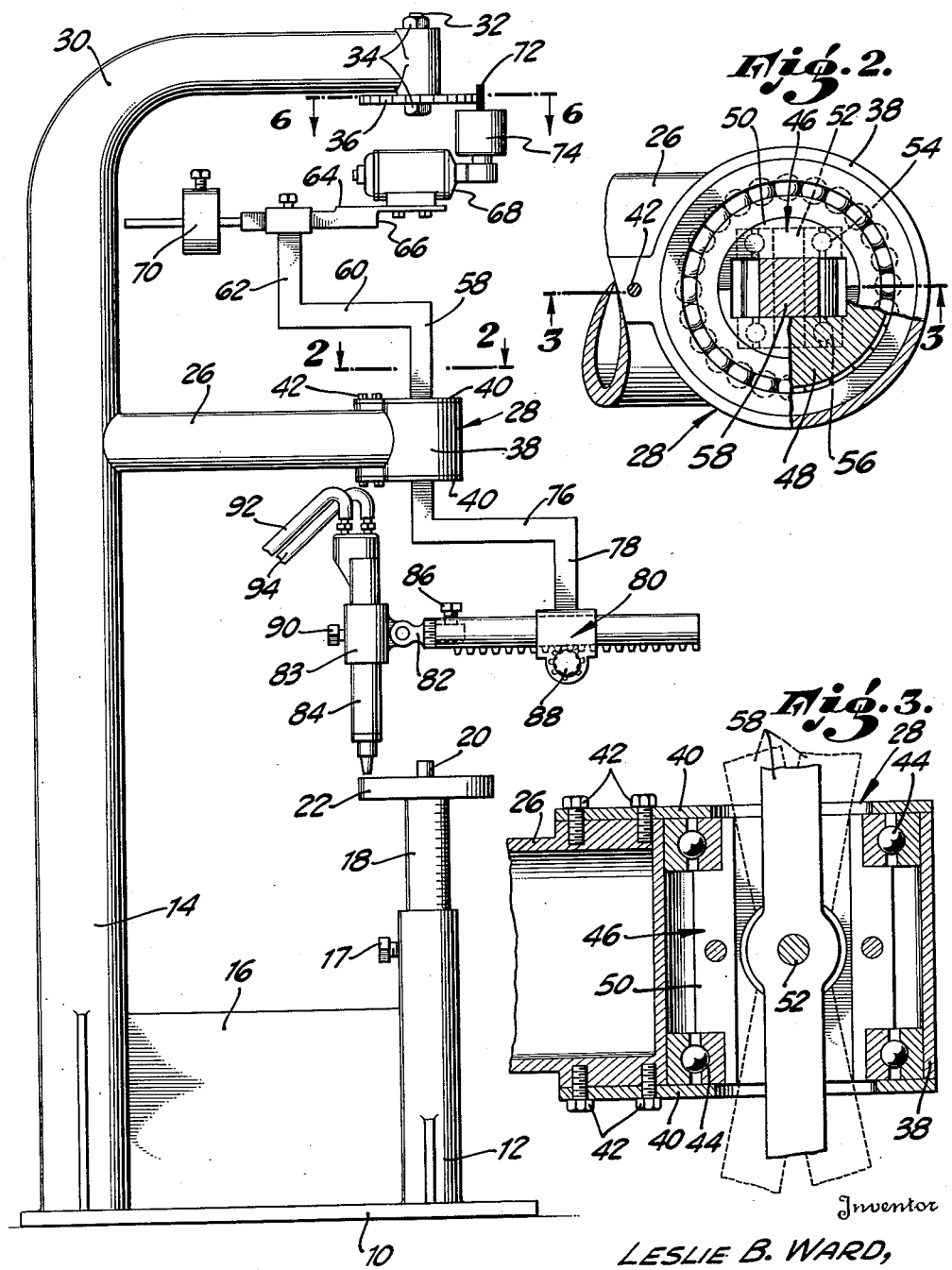

Patented Mar. 7, 1950

2,499,938

UNITED STATES PATENT OFFICE 2,499,938

FLAME CUTTER

Leslie B. Ward, Perris, Calif.

Application April 22, 1947, Serial No. 743,217

9 Claims. (Cl. 266—23)

This invention relates to flame cutters and particularly to automatic flame cutters whereby may be formed objects the configuration of which is determined by a continuous cut.

It is the object of this invention to provide a machine adapted to reproduce in a blank the configuration of a pattern or template, such reproducing being by means of flame cutting the said blank.

Heretofore numerous attempts have been made to provide such a machine as automatic and to provide such cutting as continuous; i. e., starting the cut at a particular point on the blank and following the configuration of the pattern until the line of cut reaches again the said starting point and the beginning and end of the line of cut are colinear.

Success has been had in devising machines which will accomplish this result on a blank formed of a right cylinder, but such machines are limited to use where the cutting must be done in a plane parallel to the axis around which the torch is rotated. Inclination of the torch from the axis of rotation of such machines is impossible where the cutting action is to be continuous and, thus, such machines may not be used to continuously cut frustoconical blanks into, for example, rock bit elements, beveled gears and numerous other desired objects, the cutting of which requires that the torch travel about the center of an object while inclined to the axis of the object.

It is thus an object of this invention to provide means permitting cutting around the axis of an object with the torch, and consequently the angle of cut, inclined to the axis of the object.

It is a further object of the invention to provide a machine adaptable for the above purposes, the said machine being of inexpensive, easily operated, yet sturdy construction and comprising for the most part a combination of standard, readily available parts and elements designed to achieve the above results in a new, novel and practical manner.

Further objects, advantages and features appear in the hereinafter annexed specification in which:

Figure 1 shows a side elevational view of a flame cutting machine incorporating the aforesaid inventions.

Figure 2 is a sectional view taken along the line 2—2 of Figure 1.

Figure 3 is a sectional view taken along the line 3—3 of Figure 2.

Figure 4 is an exploded view of a portion of the machine.

Figure 5 is a front elevational view of the machine.

Figure 6 is a top plan view of the template or pattern showing cooperating mechanism and being on a line taken as a section along the line 6—6 of Figure 1.

Figure 7 is a top plan view of the blank showing partially the cut therein, the line of cut following the configuration of the aforesaid template or pattern.

Figure 8 shows the cutting torch inclined from the axis of the blank.

Referring to the drawings, the machine comprises a base 10 from which extends an interior post 12 and a frame member 14, the said post and frame member being joined by a supporting rib 16. Set in the said post 12 and adjustable as to height by the set screw 17 is the carrier member 18, from the top of which extends an arbor 20. Supported by the said carrier member 18 is the blank 22 which is placed on the arbor 20 and held in place thereby.

Extending from the frame member 14 is the arm 26, the end of which carries the bearing 28, which will be described in detail hereinafter. Part of the said frame 14 extends transversely as the overhead arm 30 which supports, by the shaft 32 and the nuts 34, the pattern 36. It is to be carefully noted that the axes of the pattern 36, the blank 22 and the center point of the bearing 28 are colinear.

As heretofore noted, at the extreme of the arm 26 is the bearing 28. Of the bearing 28, the bearing housing is comprised of a well which is an extension of the arm 26 enclosed by two orificed plates 40 which are connected to the arm 26 by the bolts 42. Within the well 38 there is a core composed of split or opposed housing members 48 and 50 which is rotatable by means of the bearings 44 about a vertical axis or an axis coincident with that of the pattern 36 and the blank or workpiece 22. A shaft or pintle 52 extends between these members and serves to pivotally mount the rocker arm 58 for swinging movement in a vertical plane. Swinging movement of the rocker arm 58 is thus restricted by the pintle or shaft 52 to a single vertical plane with relation to the core 46 but the direction of this plane may shift about the axis as the core rotates within the bearing.

Mounted on the shaft 52 is the rocker arm 58, the segment 60 of which may extend at right angles to the vertical and the segment 62 of which may extend at right angles to the horizontal, terminating in a slideway 64 slidably supporting in said slideway the motor support 66. Carried by and attached to the said motor support 66 is an electric motor 68 counterbalanced by a weight 70. The motor 68 is of common construction and turns a knurled roller 72 which is magnetized by a common solenoid within the housing 74. The pattern 36 is formed of iron, steel, or other metal having magnetic properties so that the knurled roller 72 will adhere to the pattern.

The lower portion of the rocker arm 58 may extend horizontally as the segment 76 and vertically as the segment 78, terminating in the rack and pinion 80. The extremity of the said rack is bored out to receive a hinged support 82 pivotally supporting the torch support sleeve 83 which carries the torch 84 and extends into the aforesaid bored rack, being slidably rotatable therein to permit the offsetting of the torch.

Thus it will be apparent that the torch 84 may be slidably adjusted from the center axis line of the blank 22, bearing 28 and pattern 36; the torch may be normally inclined from or toward the said axis as in Figure 8 by pivoting same about the hinged support 82; and the torch may be tangentially offset from the vertical by rotation of the hinged support 82 within the aforesaid rack 80, being held in such position by the set screw 86. The set screw 88 will hold the torch 84 in its inclined position while the set screw 90 governs the distance of the cutting torch from the blank.

Current is of course supplied the electric motor 68 and solenoid in common fashion, it being thought unnecessary to show the wiring here, and likewise the proper gases are supplied the torch 84 through the conduits 92 and 94, which are connected to sources of suitable supply.

In operation, a suitable pattern 36 is selected and attached to the machine by the nuts 34, the pattern being of course bored at its center. A blank 22 of the desired size is selected and placed on the carrier member 18 over the arbor 20. The knurled roller 72 is placed against the said pattern 36 and by means of the rack and pinion 80, the pivoted support 82 and the pivotal torch supporting sleeve 83, the torch 84 is set to cut the blank at the diameter desired, the lead desired and the inclination desired.

The torch may then be lighted and adjusted to a normal preheating flame. After preheating to the proper temperature, the torch is adjusted to a cutting flame after which the motor 68 is started. The motor 68 turns the magnetized roller 72 to cause same to track about the pattern 36 as shown in Figure 6, and the progress of the roller 72 will be duplicated by the torch 84 to produce a corresponding cut in the blank 22 as shown in Figure 7.

It is notable that in my device the torch supporting arm rotates the torch about a center coincident with the axes of pattern and of blank, the bearing 20 being on center between these axes which are coaxial. This permits equal depth cutting about the surface of conical, beveled and the like objects, such as rock bit elements, and thus the machine is able, as aforesaid, to cut rock bits, beveled gears and many shapes, varieties and configurations, the cutting of which formerly necessitated hand work, saw work or indexing. Any of these methods needs must have been expensive and time consuming whereas, with this machine, the work may be performed with dispatch, with surety and with small expense.

It is further notable that whereas, as shown in the drawings, the bearing 28 is midway between the pattern 36 and the blank 22, to give rocker arm 58 ratio of 1 to 1 and thus a direct duplication of pattern 36 on the blank 22, the said bearing 28 might be placed closer to the pattern 36 or closer to the blank 22. For example, if the bearing 28 were one-third the distance from the pattern 36 to the blank 22, a 2 to 1 ratio would exist and the said pattern 36 configuration duplicated in this ratio. Likewise the ratio would be 1 to 2 if the bearing 28 were placed two-thirds the distance from the pattern 36 to the blank 22.

Having fully described my invention, it is to be understood that I do not wish to be limited to the details herein set forth, but my invention is of the full scope of the appended claims.

I claim:

1. A device of the class described comprising means for supporting a pattern, means for supporting a workpiece in axial alinement with the pattern, a core mounted for rotation about an axis coaxial with the pattern support and the workpiece support, a rocker arm pivoted intermediate its ends upon the core for swinging movement relatively thereto about a single axis at right angles to the mentioned axis, a pattern follower carried by one end of the rocker arm for following a pattern placed on the pattern support, and a cutting torch carried by the other end of said rocker arm adapted to cut a workpiece placed on the workpiece support.

2. A device of the class described comprising means for supporting a pattern, means for supporting a workpiece in axial alinement with the pattern, a core mounted for rotation about an axis coaxial with the pattern support and the workpiece support, a rocker arm pivoted intermediate its ends upon the core for swinging movement about an axis at right angles to the mentioned axis, a pattern follower carried by one end of the rocker arm for following a pattern placed on the pattern support, and a cutting torch carried by the other end of said rocker arm adapted to cut a workpiece placed on the workpiece support, means for adjustably mounting the torch on the rocker arm for adjustment relatively thereto toward and away from the first-mentioned axis in the plane of swinging movement of the rocker arm relative to said core.

3. A device of the class described comprising means for supporting a pattern, means for supporting a workpiece in axial alinement with the pattern, a core mounted for rotation about an axis coaxial with the pattern support and the workpiece support, a rocker arm pivoted intermediate its ends upon the core for swinging movement about an axis at right angles to the mentioned axis, a pattern follower carried by one end of the rocker arm for following a pattern placed on the pattern support, and a cutting torch carried by the other end of said rocker arm adapted to cut a workpiece placed on the workpiece support, means for adjustably mounting the pattern follower on the rocker arm for adjustment relatively thereto toward and away from the first-mentioned axis in the plane of swinging movement of the rocker arm relative to said core.

4. A device of the class described comprising means for supporting a pattern, means for supporting a workpiece in axial alinement with the pattern, a core mounted for rotation about an axis coaxial with the pattern support and the workpiece support, a rocker arm pivoted intermediate its ends upon the core for swinging movement about an axis at right angles to the mentioned axis, a pattern follower carried by one end of the rocker arm for following a pattern placed on the pattern support, and a cutting torch carried by the other end of said rocker arm adapted to cut a workpiece placed on the workpiece support, means for mounting the cutting torch and pattern follower on the rocker arm for adjustment independently of each other relative to the rocker arm toward and away from the first-mentioned axis in the plane of swinging movement of the rocker arm relative to said core.

5. A device of the class described comprising means for rotatably mounting a core for rotation about a given axis, means for mounting a pattern coaxially with said core, means for mounting a workpiece coaxially with said core but on the opposite side of the core from the pattern, a rocker arm pivotally mounted upon said core intermediate its ends for swinging movement about a single intersecting axis at right angles to the mentioned axis, a pattern follower mounted upon said rocker arm for following a pattern on the pattern mounting means, and a cutting torch on the other end of said rocker arm arranged to cut a workpiece placed on the workpiece mounting means.

6. A device of the class described comprising means for rotatably mounting a core for rotation about a given axis, means for mounting a pattern coaxially with said core, means for mounting a workpiece coaxially with said core but on the opposite side of the core from the pattern, a rocker arm pivotally mounted upon said core intermediate its ends for swinging movement about an axis at right angles to the mentioned axis, a pattern follower mounted upon said rocker arm for following a pattern on the pattern mounting means, and a cutting torch on the other end of said rocker arm arranged to cut a workpiece placed on the workpiece mounting means, means for mounting the cutting torch on said rocker arm for adjustment relative to the rocker arm toward and away from the first-mentioned axis in the plane of swinging movement of the rocker arm relative to said core.

7. A device of the class described comprising means for rotatably mounting a core for rotation about a given axis, means for mounting a pattern coaxially with said core on one side thereof, means for mounting a workpiece coaxially with said core but on the opposite side of the core from the pattern, a rocker arm pivotally mounted intermediate its ends upon said core for swinging movement about an axis at right angles to the mentioned axis, a pattern follower mounted upon said rocker arm for following a pattern on the pattern mounting means, a torch support, means for mounting the torch support on the other end of said rocker arm for adjustment relatively thereto in a direction extending through the first-mentioned axis, and a cutting torch mounted for adjustment about two axes at right angles to each other on the end of the cutting torch support.

8. A device of the class described comprising means for supporting a pattern and a workpiece in coaxial alinement, a rocker arm, means for mounting said rocker arm for rotation between the pattern and workpiece about the common axis of the workpiece and pattern and for pivotal movement about an intersecting axis at right angles to said axis, a power driven magnetized pattern follower on one end of the arm adapted to follow the pattern and thus rotate the rocker arm about said axis and also cause it to pivot in radial directions only in following the shape of the pattern, and a cutting torch carried by the other end of the rocker arm arranged to cut the workpiece in accordance with the pattern.

9. A device of the class described comprising means for supporting a pattern and a workpiece in coaxial alinement, a rocker arm, means for mounting said rocker arm for rotation between the pattern and workpiece about the common axis of the workpiece and pattern and for pivotal movement at right angles to said axis, a power driven magnetized pattern follower on one end of the arm adapted to follow the pattern and thus rotate the rocker arm about said axis and also cause it to pivot in following the shape of the pattern, a cutting torch and means for mounting the cutting torch for adjustment on the other end of the arm relatively thereto toward and away from said common axis, said cutting torch being arranged to cut the workpiece in accordance with the pattern.

LESLIE B. WARD.

REFERENCES CITED

The following references are of record in the file of this patent:

UNITED STATES PATENTS

| Number | Name | Date |
| --- | --- | --- |
| 1,921,887 | Schmidt | Aug. 8, 1933 |
| 2,040,914 | Anderson | May 19, 1936 |
| 2,190,360 | Howard | Feb. 13, 1940 |
| 2,413,088 | Urquhart | Dec. 24, 1946 |

FOREIGN PATENTS

| Number | Country | Date |
| --- | --- | --- |
| 120,367 | Austria | Dec. 27, 1930 |